United States Patent
Rehm

(10) Patent No.: US 6,241,261 B1
(45) Date of Patent: Jun. 5, 2001

(54) CHUCK

(75) Inventor: Fritz Rehm, Oberteuringen (DE)

(73) Assignee: SMW Autoblok Spannsysteme GmbH, Meckenbeuren (DE)

( * ) Notice: Subject to any disclaimer, the term of this patent is extended or adjusted under 35 U.S.C. 154(b) by 0 days.

(21) Appl. No.: 09/421,485

(22) Filed: Oct. 20, 1999

(30) Foreign Application Priority Data

Oct. 24, 1998 (DE) .............................. 198 49 104
Apr. 28, 1999 (DE) .............................. 199 19 403

(51) Int. Cl.$^7$ .................................................. B23B 31/16
(52) U.S. Cl. ........................... 279/124; 279/153; 269/284
(58) Field of Search ................... 279/123, 124, 279/152–154, 110; 269/262, 263, 282, 284

(56) References Cited

U.S. PATENT DOCUMENTS

| | | | |
|---|---|---|---|
| 4,029,325 | * 6/1977 | Rohm | 279/123 |
| 4,159,161 | * 6/1979 | Timmer | 269/284 |
| 4,200,300 | * 4/1980 | Rohm | 279/123 |
| 4,667,971 | * 5/1987 | Norton et al. | 279/123 |
| 4,667,972 | * 5/1987 | Hiestand | 279/123 |
| 5,174,589 | * 12/1992 | Gulde | 279/124 |
| 5,330,205 | * 7/1994 | Norton | 279/124 |

* cited by examiner

*Primary Examiner*—Steven C. Bishop
(74) *Attorney, Agent, or Firm*—Pandiscio & Pandiscio

(57) ABSTRACT

In a chuck (1) with moveable base jaws (11) inserted in radial grooves (3) in a chuck body (2) with each base jaw (11) having a releasable top jaw (21) attached to it, a joining piece (12) protruding towards the top jaw (21) is formed onto each base jaw (11) and engages in an accommodation opening (22) in the top jaw (21). Furthermore, the top jaws (21) can be clamped onto the base jaws by means of quick clamping devices (31) arranged in the top jaws (21) and the joining pieces (12).

Figure 1:
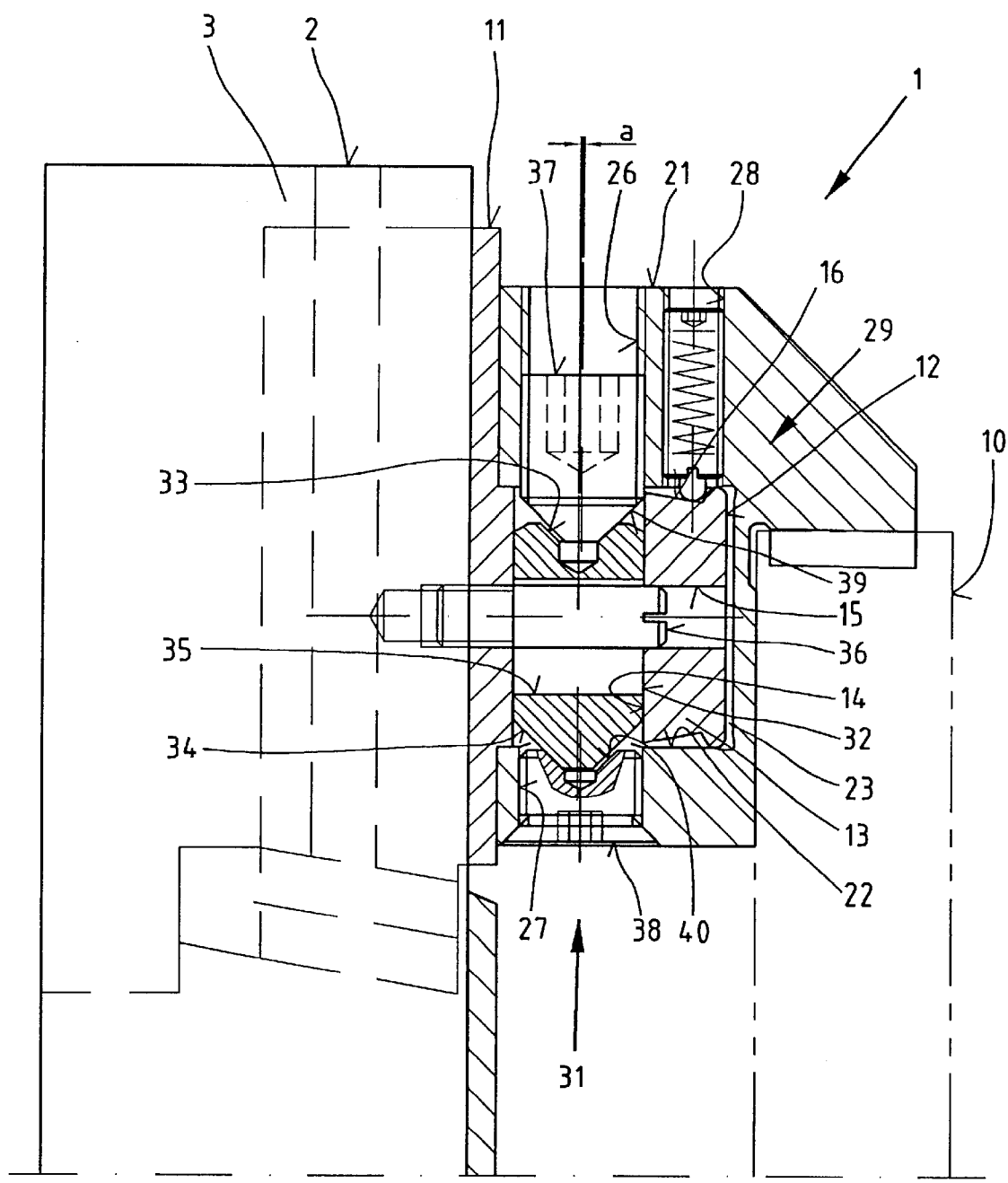

This embodiment means that the top jaws (21) of the chuck (1) can be replaced very quickly and in a simple operation, whilst a secure attachment of the top jaws (21) onto the base jaws (11) is guaranteed at all times.

5 Claims, 2 Drawing Sheets

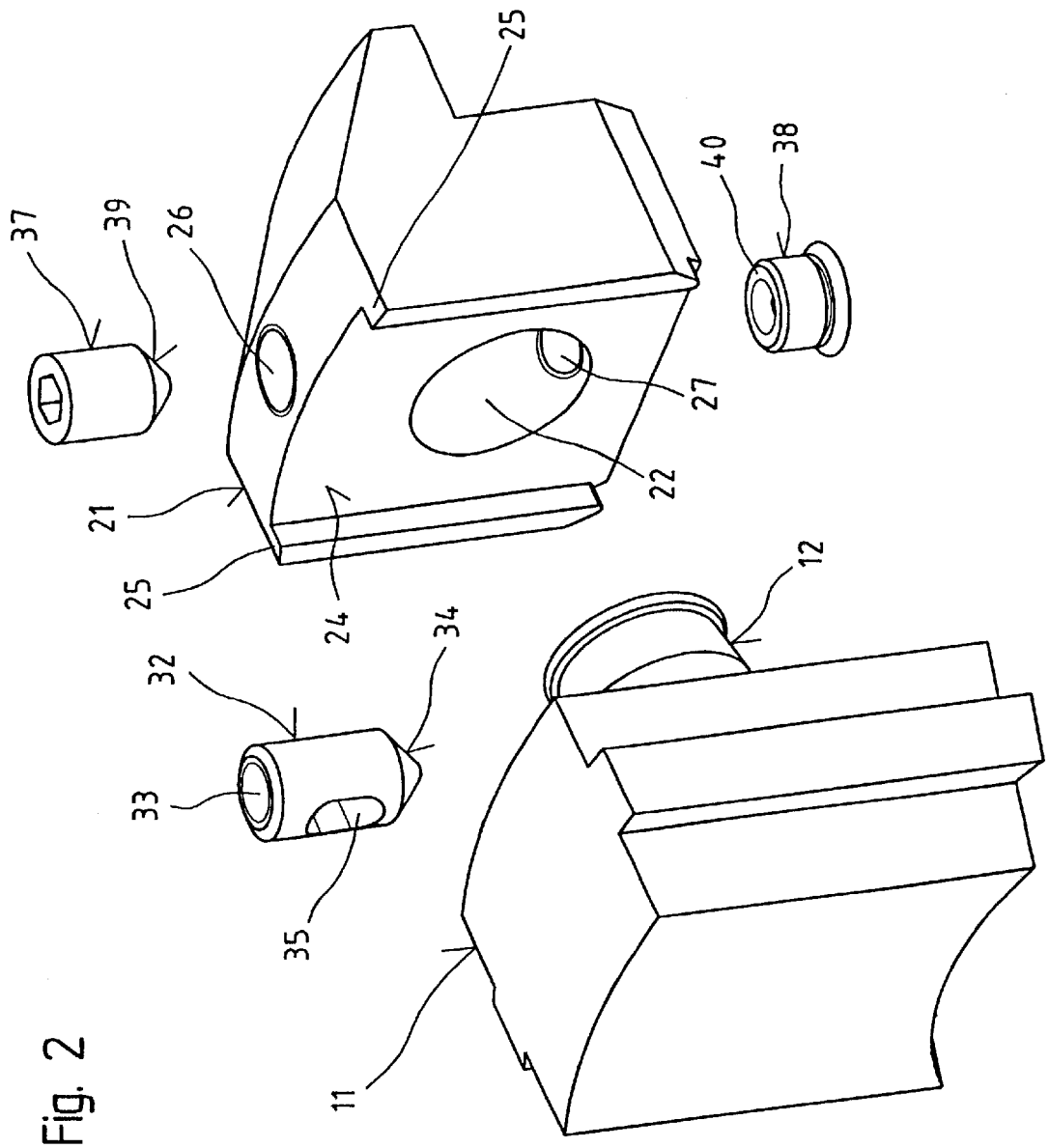

CHUCK

The present invention concerns a chuck with driveable base jaws movably inserted in radially aligned grooves in a chuck body, with a releasable top jaw positioned on each base jaw in order to hold a workpiece.

The top jaws of a chuck are often configured for various working processes and adapted to the diameter of a tool section which is to be clamped in them, and are in many cases supported against the base jaws in the direction of rotation and in the radial direction by means of intersecting guide gibs and grooves arranged on the top jaws and the base jaws, onto which they are fixed by screws. Although this type of connection has proved itself in practice, machining the components on the base and top jaws which form the groove/spring connection takes a great deal of time and is therefore expensive, since it is essential to maintain precision in the production dimensions. A further disadvantage lies in the considerable length of time required to change the top jaws, because as a rule the fixing screws have to be unfastened individually if the tool is aligned horizontally and then retightened again after the replacement, whilst in addition the chucking surfaces and/or the contact surfaces of the top jaws are impaired by the chucking screws and the holes which accommodate them.

The task of the present invention is therefore to configure the base and top jaws of a chuck of the aforementioned type in such a way that not only can the interacting components of the base and support jaws be manufactured and machined in an economical fashion, but also the chucking jaws of a chuck can be replaced in a very short time. The amount of work required in order to achieve this is to be kept low whilst nevertheless a secure attachment of the top jaws onto the base jaws is to be guaranteed at all times in conjunction with straightforward handling.

In accordance with the present invention, this is achieved in a chuck of the type mentioned initially in that a joining piece is formed onto each base jaw protruding in the direction of the top jaw, with this joining piece engaging in an accommodation opening worked into the top jaw, and in that the top jaws can be clamped onto the base jaws or the joining pieces by quick clamping devices arranged in the top jaws and on the joining pieces which act in the axial direction of the top jaws and the joining pieces.

It is advantageous for each of the top jaws to be provided with an accommodation groove for the base jaws which is, in a preferred embodiment, formed by guide gibs arranged laterally in the external edge zones of the top jaws, and for the joining pieces of the base jaws to be formed as cylindrical pins and the accommodation openings of the top jaws to be formed as blind holes.

Each of the quick clamping devices can beneficially be made from a self-aligning pin which is held in radially aligned holes in the joining pieces in such a way as to permit limited sliding movements, with the ends of the pins having a recessed or a projecting cone, and from two holding screws guided in diametrically opposed threaded holes in the top jaws, with these screws possessing a projecting cone or a recessed cone corresponding to the recessed cone or projecting cone of the self-aligning pin, and located with an axial offset in relation to the self-aligning pin by means of which the top jaws are pressed on.

A further feature, which is for example advantageous during overhead working, ensures that the top jaws remain held in position on the joining pieces after the quick clamping devices have been released and is effected in that each of the top jaws are provided with a spring detent which engages in a circumferential groove worked into the joining pieces.

If the base jaws and the top jaws of a chuck are configured in accordance with the present invention, then a reliable and high-strength connection is provided between the two, which is economical to produce and, above all, can be connected and released easily and within a short time. This is because the joining pieces of the base jaws and the accommodation openings of the top jaws can be machined to precise dimensions without difficulty, whilst most of the quick clamping devices are easily accessible from above. Consequently, the top jaws can be changed without difficulties.

This is because during a jaw change, it is only necessary to release the quick clamping devices, e.g. using an Allen key which can be inserted radially from the outside into the chuck body, whilst moving the chuck body in the axial direction allows the top jaws to be pulled off the joining pieces. Differently configured top jaws can be inserted onto the joining pieces and the quick clamping devices can be reactivated, e.g. by a rotational movement, in order to complete the jaw change.

The specially configured quick clamping devices mean that each of the base jaws and top jaws form a unit which is chucked in itself, which means that a high degree of rigidity is assured between these components and no impurities can achieve ingress between them.

Furthermore, it is advantageous that the joining pieces of the base jaws which are configured as cylindrical pins and the corresponding holes worked into the top jaws can be manufactured to precise dimensions without difficulty and in an economical fashion, and that the quick clamping devices are made up of tried-and-tested components. As a result, inexpensive production is assured, whilst as a particular advantage, these components can be held in stock as prefabricated parts and it is only necessary to adapt the top jaws to the individual workpiece which is to be clamped in them. As a result, the ability to make deliveries at short notice is always guaranteed. With a simple design and configuration, the chuck configured in accordance with this proposal not only permits reproducible and precise chucking of a workpiece, but also makes it easily possible to adapt the chuck to differently shaped workpieces by means of changing the top jaws in an unproblematical procedure.

The drawing shows a sample embodiment of a chuck configured in accordance with the present invention, the details of which are explained below. In the drawing, FIG. 1 shows the chuck with a chucked workpiece as an axial section and FIG. 2 shows a base jaw and top jaw of the chuck in accordance with FIG. 1, in a perspective representation.

The chuck shown in FIG. 1 and identified as 1 is used for clamping a workpiece 10 drawn in dashed/dotted lines, and its principal components are movable base jaws 11 inserted in radially aligned grooves 3 in a chuck body 2 and replaceable top jaws 21 attached to the base jaws 11. The base jaws 11 of the chuck 1 which are guided in the grooves 3 can be driven in various ways, e.g. by hand or by means of a servo device via wedge hooks or wedge rods and thereby adjusted radially for opening and closing the chuck 1.

In order to connect the top jaws 21 to the base jaws 11 in a releasable connection, each of the base jaws 11 has a joining piece 12 formed onto it in the shape of a cylindrical pin 13, whilst accommodation openings 22 in the form of blind holes 23 are worked into the top jaws 21, with the joining pieces 12 engaging in the accommodation openings 22. The top jaws 21 can be clamped onto the joining pieces 12, and therefore onto the base jaws 11, by means of quick clamping devices 31 which act in the axial direction of the joining pieces 12.

The quick clamping devices 31 are formed by a self-aligning pin 32 which has a limited range of radial movement and by two holding screws 37 and 38, which are axially offset in relation to one another when installed in order to generate a force acting in the axial direction of the joining pieces 12. To this end, the self-aligning pins 32 are inserted in holes 14 worked into the joining pieces, whilst the holding screws 37 or 38 are screwed into threaded holes 26 or 27 worked into the top jaws 21. Furthermore, each of the self-aligning pins 32 is provided with a recessed cone 33 and a projecting cone 34 which interact with a projecting cone 39 or a recessed cone 40 worked onto the holding screws 37 or 38. Threaded holes 15 are worked into the joining pieces 12 in order to hold the self-aligning pins 32 in the joining pieces 12, and the self-aligning pins 32 are equipped with slots 35 into which pins 36 screwed into the threaded holes 15 engage.

The quick clamping devices 31 function in that screwing the holding screws 37, e.g. using an Allen key, into the recessed cone 33 of the self-aligning pins 32 causes the projecting cone 34 of the self-aligning pins 32 to be braced against the recessed cone 40 of the holding screws 38 with the effect that the inclined surfaces cause a force to be created acting in the axial direction of the joining pieces 12 and the top jaws 21 are pressed against the base jaws 11. It is a precondition of this, however, that the self-aligning pins are located with a slight axial offset "a" in relation to the holding screws 37 and 38. This is achieved by having the axes of the holes 14 accommodating the self-aligning pins 32 angled towards the base jaws 11 when the top jaws 21 are in contact with the corresponding surfaces of the base jaws 11, and offset in relation to the axes of the threaded holes 26 and 27 into which the holding screws 37 and 38 are screwed, with the effect that when each of the approximate halves of the holding screws 37 and 38 comes into contact with the diametrically opposed self-aligning pins the resulting effect is to thrust the top jaws 21 in an axial direction, thereby establishing the chucking force.

If the holding screws 37 are unscrewed far enough so they no longer engage in the corresponding joining pieces 12, the top jaws 21 can be released by an axial movement of the base jaws 11 and replaced.

In order to prevent the top jaws 21 from twisting, they are equipped with an accommodation groove 24 into which the base jaws 11 engage. To this end, as can be seen in particular in FIG. 2, two guide gibs 25 are formed onto the edge zones of the top jaws 21.

Furthermore, the top jaws 21 are provided with spring detents 29 inserted in threaded holes 28, with the detents 29 engaging in circumferential grooves 16 formed into the joining pieces 12. The top jaws 21 are therefore held on the joining pieces 12 when the quick clamping devices 31 are released, even when the chuck 1 is installed in a vertical alignment, and the top jaws 21 can only be removed by overcoming the holding force of the spring detent 29.

What is claimed is:

1. A chuck (1) with movable base jaws (11) disposed in radially extending grooves (3) in a chuck body (2), with a releasable top jaw (21) positioned on selected ones of the base jaws (11) to hold a workpiece (10), wherein a joining piece (12) is formed onto each of said base jaws (11) said joining piece (12) comprising a pin (13) having a hole (14) extending radially therethrough and a pin (32) disposed in the hole (14), the joining piece protruding in a direction of the top jaw (21), said joining piece (12) engaging in an opening (22) in the top jaw (21), said top jaw (21) having holes (26,27) therein substantially normal to the opening (22) and to the joining piece (12) disposed in the opening (22), and wherein the top jaws (21) are adapted to be clamped onto the selected ones of the base jaws (11) and the joining pieces (12) by quick clamping devices (31) comprising opposed holding screws 37, 38 disposed in the holes (26,27) and joining the pin (32).

2. The chuck in accordance with claim 1, wherein each of the top jaws (21) is provided with a groove (24) for receiving one of the base jaws (11), said grooves being formed by guide pins (25) arranged laterally in external edge zones of the top jaws (21).

3. The chuck in accordance with claim 1 wherein the joining piece pins (32) of the base jaws (11) are formed as cylindrical pins (13) and the openings (22) of the top jaws (21) are formed as cylindrically-shaped blind holes (23).

4. The chuck in accordance with claim 1, wherein each of the quick clamping devices (31) comprises the pin (32) held in the radially aligned hole (14) in the joining piece (12) to permit limited sliding movements of the pin (32), with first and second ends (33,34) of the pin 32 having a recessed cone (33) and a projecting cone (34) at the first and second ends, respectively, and two holding screws (37,38) guided in the diametrically opposed threaded holes (26,27) in the top jaws (21), with said screws (37,38) possessing respectively, a projecting cone (39) and a recessed cone (40) complementary to the recessed cone (33) and projecting cone (34) of the pin (32), and located with an axial offset in relation to the pin (32), by means of which the top jaws (21) are connected to the joining piece (12).

5. The chuck in accordance with claim 3, wherein each of the cylindrical pins (13) is provided with a circumferential groove (16), and each of the top jaws (21) is provided with a spring-biased detent (29) which engages in the circumferential groove (16).

* * * * *